(12) United States Patent
Scott et al.

(10) Patent No.: US 7,231,481 B2
(45) Date of Patent: Jun. 12, 2007

(54) INTELLIGENT DOCKING STATION FOR A HANDHELD PERSONAL COMPUTER

(76) Inventors: Bryan Scott, 7900 Churchill Way #2402, Dallas, TX (US) 75251; Ramon Perales, 7900 Churchill Way #13102, Dallas, TX (US) 75251; Saneesh Divakaran, 2400 Waterview Pkwy., #327, Richardson, TX (US) 75080

( * ) Notice: Subject to any disclaimer, the term of this patent is extended or adjusted under 35 U.S.C. 154(b) by 289 days.

(21) Appl. No.: 10/053,433

(22) Filed: Feb. 1, 2002

(65) Prior Publication Data

US 2003/0149817 A1    Aug. 7, 2003

(51) Int. Cl.
G06F 13/00 (2006.01)

(52) U.S. Cl. .................. 710/303; 710/8; 710/15; 710/62; 710/72; 710/301

(58) Field of Classification Search ............ 710/8, 710/15, 31, 72, 73, 62, 64
See application file for complete search history.

(56) References Cited

U.S. PATENT DOCUMENTS

| | | | | |
|---|---|---|---|---|
| 5,278,730 | A * | 1/1994 | Kikinis ................. | 361/686 |
| 5,313,596 | A * | 5/1994 | Swindler et al. ......... | 710/303 |
| 5,396,400 | A * | 3/1995 | Register et al. ......... | 361/686 |
| 5,489,773 | A * | 2/1996 | Kumar ................. | 235/380 |
| 5,581,766 | A * | 12/1996 | Spurlock ............... | 713/2 |
| 5,668,977 | A * | 9/1997 | Swanstrom et al. ..... | 395/500 |
| 5,819,112 | A * | 10/1998 | Kusters ................ | 710/36 |
| 6,044,215 | A * | 3/2000 | Charles et al. ......... | 395/500 |
| 6,101,087 | A * | 8/2000 | Sutton et al. ........... | 361/686 |
| 6,266,539 | B1 * | 7/2001 | Pardo .................. | 455/556 |
| 6,286,060 | B1 * | 9/2001 | DiGiorgio et al. ....... | 710/31 |
| 6,309,230 | B2 * | 10/2001 | Helot .................. | 439/131 |
| 6,744,740 | B2 * | 6/2004 | Chen ................... | 370/255 |
| 2002/0103951 | A1 * | 8/2002 | Huber al. .............. | 710/72 |
| 2003/0120849 | A1 * | 6/2003 | Roslak et al. .......... | 710/303 |
| 2003/0142089 | A1 * | 7/2003 | Myers .................. | 345/213 |
| 2003/0145148 | A1 * | 7/2003 | Zhang et al. ........... | 710/305 |

OTHER PUBLICATIONS

U.S. Appl. No. 60/297,290.*
The Authoritative Dictionary of IEEE Standards Terms; 2000; IEEE Press; Seventh Edition; page 298.*

* cited by examiner

Primary Examiner—Kim Huynh
Assistant Examiner—Alan S. Chen
(74) Attorney, Agent, or Firm—Thrasher Associates

(57) ABSTRACT

The invention transfers a data element from a device to a handheld computer. In general, the method receives a device-based data element at a docking station based co-processor, performs a driver conversion to convert the device-based data element into a bus-enabled data element, and places the bus-enabled data element on a handheld compatible bus. The method may also transform a data packet by detecting an input packet, retrieving a packet identifier (ID) from the input packet, and dispatching the input packet to a device driver based on the packet ID, the device driver capable of converting the input packet from a handheld computer packet type to a device packet type. The invention is also the systems that enable the method. As a device, the invention is an intelligent docking station. The intelligent docking station includes a co-processor capable of converting a hand held-based data element into a device enabled data element, a bus interface coupled to the co-processor, and a port coupled to the co-processor. The invention is also a system that incorporates the intelligent docking station.

20 Claims, 3 Drawing Sheets

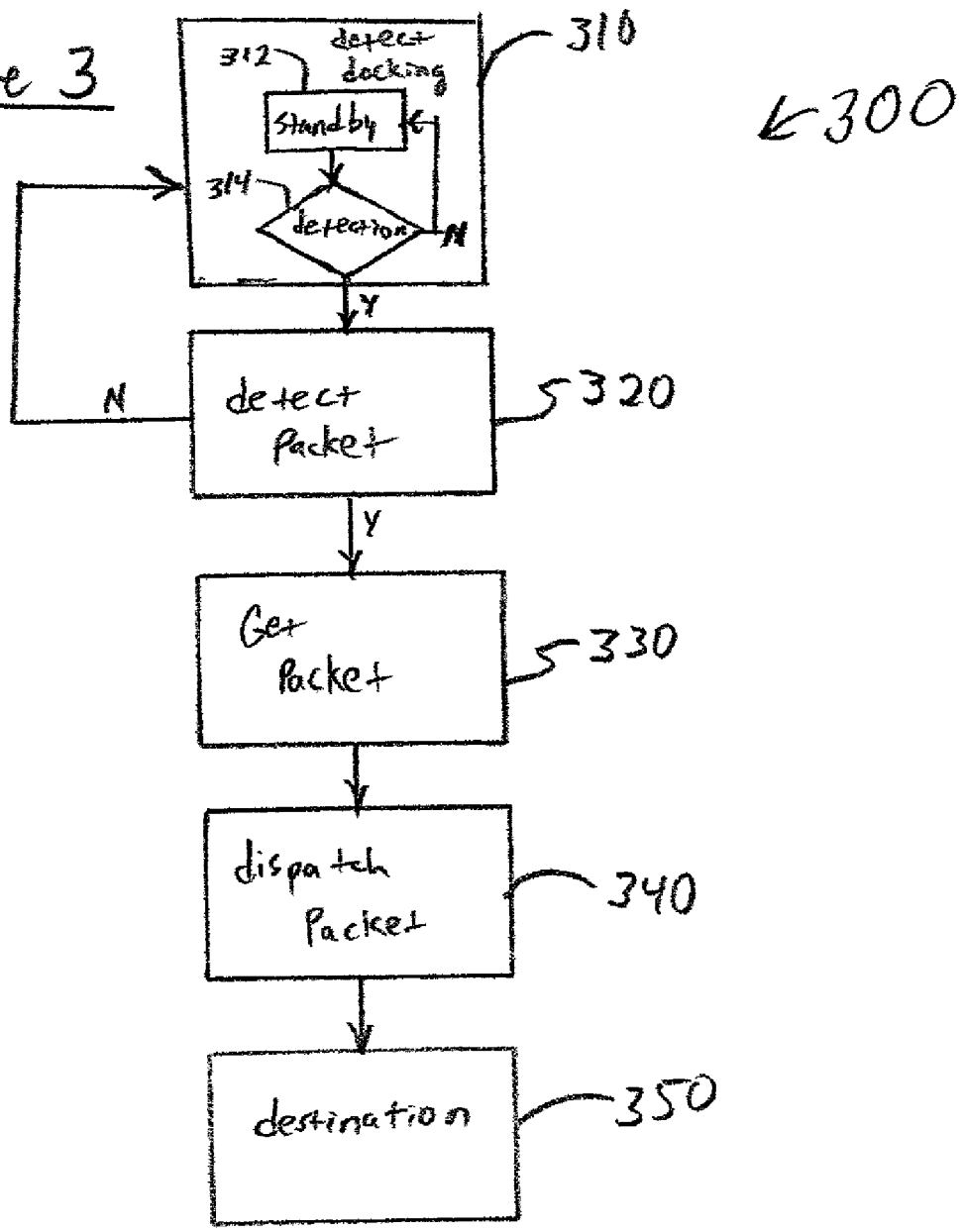

INTELLIGENT DOCKING STATION FOR A HANDHELD PERSONAL COMPUTER

BACKGROUND OF THE INVENTION

1. Technical Field

The present invention generally relates to desktop, mobile, or portable computing.

2. Problem Statement

Because of in part the ability to make businesses and households more efficient, personal computers (PCs) have earned a solid place in homes and businesses. However, PCs are typically bulky, require large amounts of power, and occupy a large amount of surface area, called a "footprint."

Computers small enough to be held in a single hand, called "handhelds" or personal digital assistants (PDAs), provide significant computing power in a small device that uses relatively little power. Unfortunately, handhelds do not offer the most user-friendly input/output devices, such as a keyboard and mouse. Instead, a user of a handheld must be content with using a stylus or other data entry device. Accordingly, it is desirable to provide a device, system, and method for integrating the convenience of a handheld into a PC-type input/output environment. The invention provides such devices, systems, and methods.

SUMMARY OF THE INVENTION

The invention achieves technical advantages transferring a data element from a device to a handheld computer, and from a handheld computer to a device. The invention may be embodied as a method. In general, the method receives a device-based data element at a docking station based co-processor, performs a driver conversion to convert the device-based data element into a bus-enabled data element, and places the bus-enabled data element on a handheld compatible bus. In one embodiment, the method may transform a data packet by detecting an input packet, retrieving a packet identifier (ID) from the input packet, and dispatching the input packet to a device driver based on the packet ID, the device driver capable of converting the input packet from a handheld computer packet type to a device packet type.

The invention, in another embodiment, is also a system that enables the method. For example, the invention is in one embodiment a software system for an intelligent docking station IDS. The software system includes an IDS operating system, a top-level device driver, the top-level device driver capable of assembling handheld device-based data elements on an input packet and capable of formatting IDS device-based data elements for the handheld low-level device driver on an output packet, a communication driver, the communication device driver capable of sending and receiving bus-enabled data elements, and a low-level device driver (the low-level device driver being capable of controlling peripheral devices with device-based data elements.) The IDS operating system is enabled to assemble data elements from the communication driver and format the data elements for the low-level device driver.

In yet another embodiment, the invention is a device. As a device, the invention is an intelligent docking station. The intelligent docking station includes a co-processor capable of converting a handheld-based data element into a device enabled data element, a bus interface coupled to the co-processor, and a port coupled to the co-processor. The invention may also be embodied as a system that incorporates the intelligent docking station.

The methods may be embodied as manufactured devices. For example, the methods may be placed on a computer readable medium, such as a computer diskette, CD ROM, or other memory device. In addition, the methods maybe placed in a computer memory or hard-written onto a processor to enable a general computing device to be transformed into a specific computing machine, or specific system. A computer system may be set up as a network capable of executing any of the methods. One such network could be the Internet, and the network could employ an application service provider. In addition, the invention may be embodied as one or more data signals that transform a general network into a task-specific network (or, task specific distributed machine).

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. The invention is limited only by the claims.

BRIEF DESCRIPTION OF THE DRAWINGS

Various aspects of the invention, as well as an embodiment, are better understood by reference to the following detailed description. To better understand the invention, the detailed description should be read in conjunction with the drawings in which:

FIG. 3 illustrates a block-flow diagram of an intelligent docking station (IDS) algorithm.

DETAILED DESCRIPTION

Interpretative Considerations

Figure 1:
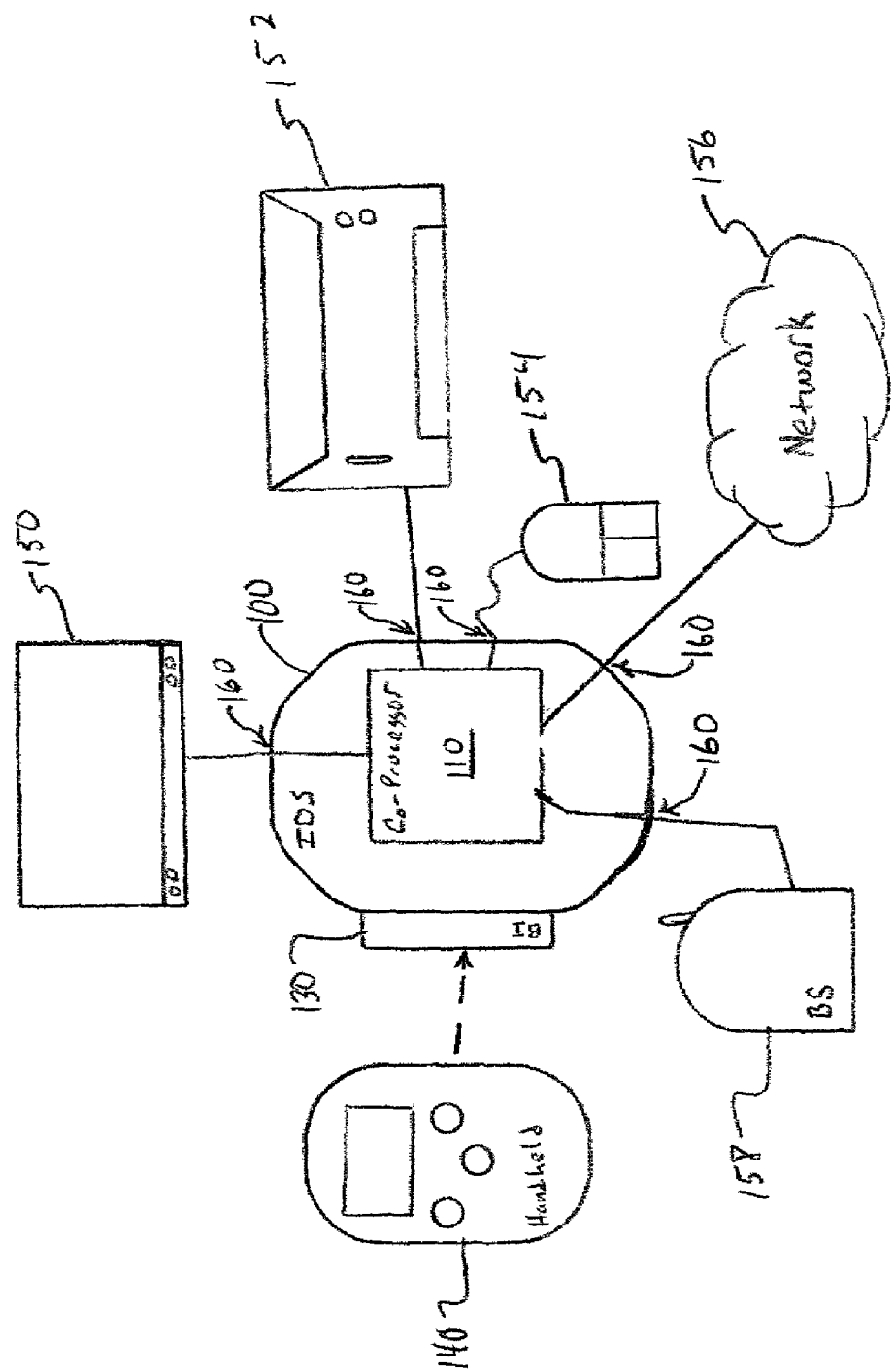
FIG. 1 depicts an intelligent docking station system.

When reading this section (An Exemplary Embodiment of a Best Mode, which describes an exemplary embodiment of the best mode of the invention, hereinafter "exemplary embodiment" or "Detailed Description"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act maybe used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" maybe done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the Claims section.

Computer Systems as Software Platforms

A computer system typically includes hardware capable of executing machine-readable instructions, other hardware, as well as the software for executing acts (typically machine-readable instructions) that produce a desired result. In addition, a computer system may include hybrids of hardware and software, as well as computer sub-systems. The way hardware is organized within a system is known as the system's architecture (discussed below).

Software includes machine code stored in memory, such as RAM or ROM, or machine code stored on devices (such as floppy disks, or a CD ROM, for example). Software may include executable code, an operating system, or source or object code, for example. In addition, software encompasses any set of instructions capable of being executed in a client machine or server—and, in this form, is often called a program or executable code.

Programs often execute in portions of code at a time. These portions of code are sometimes called modules or code-segments. Often, but not always, these code segments are identified by a particular function that they perform. For example, a counting module (or "counting code segment") may monitor the value of a variable. Furthermore, the execution of a code segment or module is sometimes called an act. Accordingly, software may be used to perform a method that comprises acts. In the present discussion, sometimes acts are referred to as steps to help the reader more completely understand the exemplary embodiment.

Software also includes description code. Description code specifies variable values and uses these values to define attributes for a display, such as the placement and color of an item on a displayed page. For example, the Hypertext Transfer Protocol (HTTP) is the software used to enable the Internet and is a description software language.

Hybrids (combinations of software and hardware) are becoming more common as devices for providing enhanced functionality and performance to computer systems. A hybrid is created when traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Computer sub-systems are combinations of hardware or software (or hybrids) that perform some specific task. For example, one computer sub-system is a soundcard. A soundcard provides hardware connections, memory, and hardware devices for enabling sounds to be produced and recorded by a computer system. Likewise, a soundcard may also include software needed to enable a computer system to "see" the soundcard, recognize the soundcard, and drive the soundcard.

Sometimes the methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to transport the invention. It should be noted in the following discussion that acts with like names are performed in like manners, unless otherwise stated.

DESCRIPTION OF THE DRAWINGS

Reference is now made to the figures, and in particular with reference to FIG. 1, which depicts an intelligent docking station system. The intelligent docking station system comprises an intelligent docking station 100, which is capable of coupling to a handheld computer 140 or a device. In general, the intelligent docking station 100 includes a co-processor 110 capable of converting a handheld computer-based data element into a device enabled data element, a bus interface (BI) 130 coupled to the co-processor 110, and a port 160, coupled to the co-processor 110. In an alternative embodiment, the ports 160 are implemented as wireless ports such as infra-red or 802.11, or Home RF ports, for example. In one embodiment, the intelligent docking station 100 includes logic (not shown) that is coupled between each port 160 and the co-processor 110. The BI 130 may be any bus system used in any handheld computer, and is preferably a bi-directional bus such as Card Bus, PCMCIA, PCI, VME, ISA, SCSI, or a wireless bus. Similarly, the BI 130 may be simulated via USB, Firewire, or NIC, for example. The logic is employed to provide additional functionality to the intelligent docking station 100.

For example, the logic could be a modem, thus enabling the intelligent docking station 100 to connect with special devices or networks, such as the base station (BS) device 158. Other devices that maybe coupled to the co-processor 110 through corresponding logic, which is preferably device specific logic, include a monitor 150, a printer 152, a mouse 154, a data storage device (not shown), or a network 156, such as the Internet. Of course, it should be understood that the devices provided herein are exemplary only, and any type of input or output device that is connectable to a PC is also connectable to the intelligent docking station 100 using the invention. Furthermore, it should be understood that a device may also be integrated with, and housed inside, the IDS 100.

In one embodiment, the invention is an intelligent docking station system. The system includes a docking station 100 having a co-processor 110 capable of converting a hand held-based data element into a device enabled data element, a bus 130 that couples the docking station 100 to a handheld computer 140, and a device coupled to the docking station 100.

Figure 2:
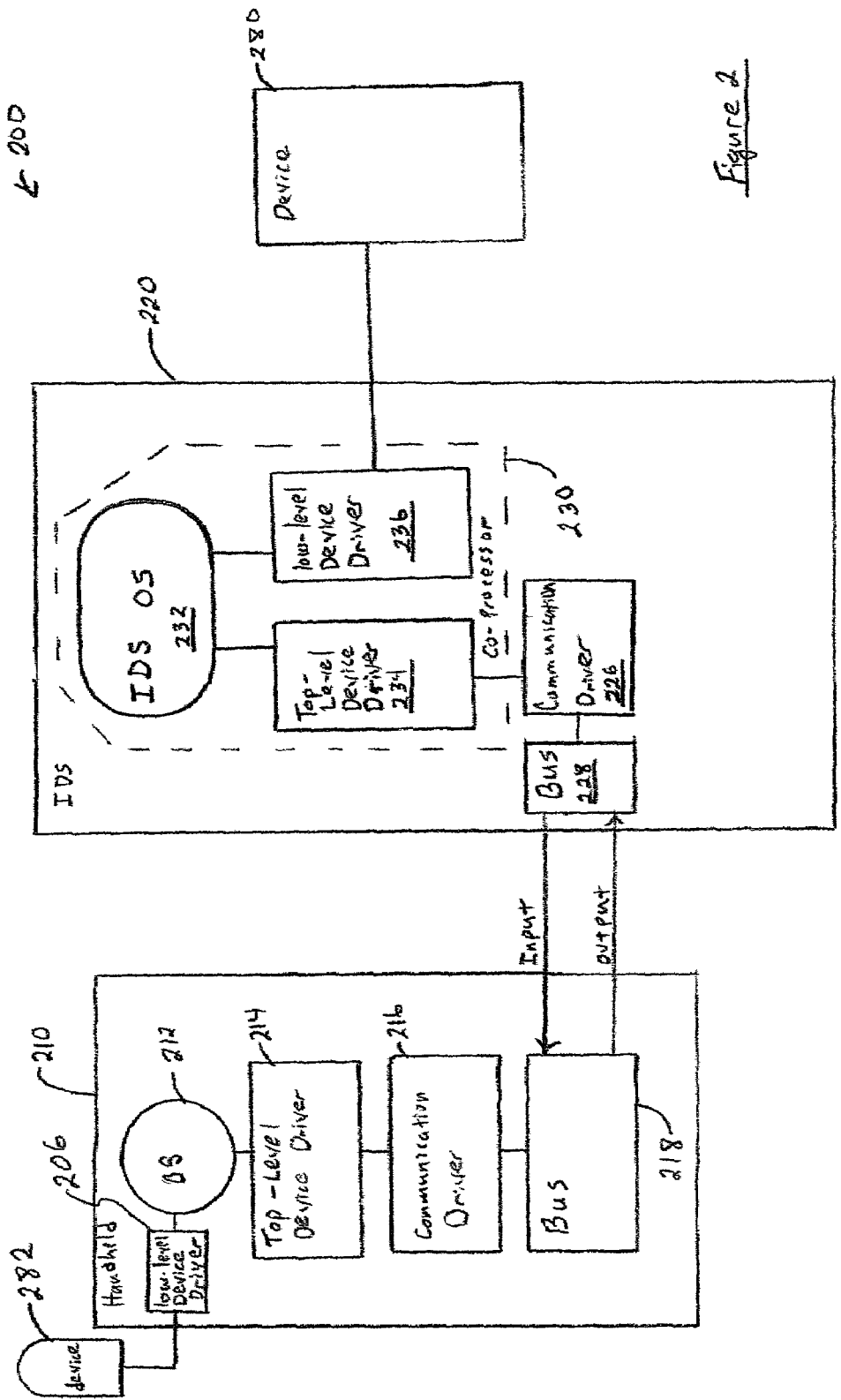
FIG. 2 shows a software system for an intelligent docking station.

FIG. 2 shows a software system 220 for an intelligent docking station. The software system for an intelligent docking station (the software system 220) 220 includes an IDS operating system (IDS OS) 232, which could be any common embedded or handheld operating system. Common operating systems include QNX RTOS, WindRiver VxWorks, Lineo Embeddix, Palm OS, Windows CE, Windows for Pocket PC, EPOC, and other Linux variants, for example. In addition, the software system 220 includes a communication device driver 226 which is capable of sending and receiving bus-enabled data elements, a low-level driver 236 that is capable of sending and receiving device-based data elements, and a top-level device driver 234 capable of assembling handheld device-based data elements on an input packet and capable of formatting IDS device-based data elements for the handheld low-level device driver 206 on an output packet.

Top level device drivers typically perform at least two functions. First, when a top level device driver receives an output data element from a communication driver, it gathers a packet and/or packet identification information and assembles a device-based data element that is understandable by a low level device driver. In addition, prior to sending input data elements received from a low level device driver, the top level device driver formats the data for an appropriate low level device driver. The low level device driver then passes the data element to a specific device, alters the data element in some way, or invokes an operating system to do something with the device.

The low-level device driver 236 is typically a device specific driver that sends and/or receives data elements from a specific device, such as a monitor or keyboard (in which case the device driver is called a display device driver or a keyboard device driver). In a preferred embodiment, the IDS operating system 232 is enabled to format the device-based data elements for the low-level handheld low-level device driver 206 and forward the formatted device-based data elements to the communication driver 226. In a preferred embodiment, the IDS OS 232, the top-level device driver 234, and the low-level device driver 236 are maintained on the co-processor 230. However, separate logic, software, or firmware may be used to accomplish the same conversions.

Other elements of the software system 220 include a bus module 228 which controls traffic across a bus that couples the IDS to a handheld computer. In addition, the software system 220 may include logic (not shown) for providing specific functionality to a device module 280.

The invention is also a software system, embodied as a PDA system 210. The PDA system 210 includes any embedded or handheld computer operating system 210, which may be any of the systems discussed above, or any other common embedded or handheld computer operating system. The PDA system 210 also includes a handheld-enabled low-level device driver 206 that is capable of transferring handheld-based data directly between the PDA system 210 and a device, such as a monitor or a keyboard. The PDA system 210 has a top-level device driver 214 for formatting hand held-based device data to IDS specific low-level device data (236). In addition, the PDA system 210 has a communication driver 216 for converting the information normally handled by the device driver 214 into bus-enabled data that can be transferred across a bus 218 that couples the handheld device to an intelligent docking station. Of course, although the communication driver 216 discussed above is described as software, the communication driver 216 may be embodied in firmware, or maintained within the PDA OS 212.

Exemplary Methods

FIG. 3 illustrates a block-flow diagram of an intelligent docking station (IDS) algorithm 300. In general, the IDS algorithm 300 can control a data flow between a handheld computer and a device. As a method of transferring a data element from a device to a handheld computer, after detecting a docking condition, and activating a communication driver in response to the docking condition (a docking detection act), the IDS algorithm 300 receives a device-based data element at a docking station based co-processor in a receive device data element act. The device-based data element is generated by a specific device, or, may be generated by device simulation software.

Next, if necessary, a top-level device driver reformats the device data element to the handheld device-based data element, which is then converted into a bus-enabled data element in a convert data element act by the communication driver. The conversion may take place in the IDS OS of the intelligent docking station, in separate software, or in firmware. Then, the IDS algorithm 300 places the bus-enabled data element on a handheld compatible bus in a bus placement act. In a system implementation of the IDS algorithm 300, the bus-enabled data element is received in a handheld computer, and the bus-enabled data element is converted into a handheld data element in a convert to handheld act.

Similarly, the IDS algorithm 300 can transform data from a handheld to a device. Accordingly, the IDS algorithm 300 detects a docking condition in a detect docking act. Then, when handheld-based data is to be sent to a device, a handheld-based data element is converted into a bus-enabled data element via a communication driver in a bus enable act. Then, in a bus placement act, the bus-enabled data element is placed on a handheld compatible bus. Next, as a conversion act, the bus-enabled data element is received at a docking station based co-processor, and a driver converts the bus-enabled data element into a device-enabled data element. Accordingly, the device-enabled data is placed on an output port in a send data act.

The preferred IDS algorithm 300 is specifically illustrated by the block-flow diagram of FIG. 3. First, the IDS algorithm 300 detects a docking condition in a detect docking act 310. Accordingly, within a detect docking act 310 a communication driver in the IDS waits in a low-power standby state act 312, once docked the handheld will send an initiation command for the IDS to initialize the IDS docking sequence (314). If no initialization sequence is detected as illustrated by the "n" arrow designation, then the IDS algorithm 300 returns to a standby state act 312, which occurs between detection sequences. Of course, in the event of wireless docking, a wireless device will be detected by the IDS.

If the detection sequence 314 is initiated when the handheld computer is docked with an intelligent docking station, then the IDS algorithm 300 proceeds to a detect packet act 320. In the detect packet act 320 the IDS detection algorithm 300 queries ports on the IDS as well as the bus that couples the handheld computer to the IDS. If no packet is detected, then the IDS detection algorithm 300 returns to the detect docking act 310.

If a packet is detected on a port or a bus in the detect packet act 320, in one embodiment by activating an Input Data line, then the IDS detection algorithm 300 proceeds to retrieve at least a packet identifier (ID) in a get packet act 330. Alternatively, the IDS detection algorithm 300 may gather the entire packet in the get packet act 330. Next, in a dispatch packet act 340, the packet is sent to a communication driver.

Finally, in a destination act 350, in the event that the packet is headed for a device, the handheld OS sends the packet to the appropriate device via the appropriate port. Similarly, if in the destination act 350, the packet is destined for a handheld computer, the IDS destination algorithm 300 send the packet to the handheld OS for further processing as is known in the art.

For example, one may follow the flow of a graphics packet from the handheld computer to a display device. First, a communication driver detects that a docking condition has occurred in a detect docking act 310. Then, the IDS OS detects that a packet has arrived on the bus by detecting a signal on an Input Data line. Accordingly, the IDS OS retrieves at least the packet ID, and knows from this packet ID that the packet should be delivered to a display device driver, and so dispatches the display device driver to convert the graphics packet from a bus-enabled data element to a display device-based data element. Finally, the IDS OS sends the display device-based data element to the display device.

Similarly, one may follow the flow of a packet from a keyboard to the handheld computer. First, a communication driver detects that a docking condition has occurred in a detect docking act 310. Accordingly, the IDS OS retrieves at least the packet ID, and knows from this packet ID that the packet is a keyboard stroke or a series of keyboard strokes, and so the IDS OS dispatches the keyboard device driver to convert the device data element packet from a keyboard data element into a bus-enabled data element. Then, the IDS OS directs the IDS based communication driver to place the bus-enabled data element on the bus. Finally, the communication driver actually places the bus-enabled data element on the bus.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An intelligent docking station (IDS) system, comprising:
    a docking station having a co-processor capable of converting a hand held-based data element into a device enabled data element, where the device is not a docking station;
    a bus that couples the docking station to a handheld computer;
    the handheld computer having a processor operated by a first operating system;
    the co-processor being operated by a second operating system, the second operating system communicating with a top-level driver capable of formatting handheld-based data element into a device enabled data element, and also enabled to deliver the device enabled data element to a low level device driver, the top level driver translates and transfers data between the handheld computer and the docking station, and the low level driver translates data between the docking station and a device controlled by the low level device driver, the device coupled to the docking station;
    the first operating system communicates by using a first device driver to create a first device driver data, the first device driver data capable of animating a first device being converted by the second operating system to a second device driver data capable of animating a second device; and
    the second operating system directing the transfer of data from the handheld computer and to the docking station, and from the docking station and to the handheld computer.

2. The IDS system of claim 1 wherein the device is a monitor.

3. The IDS system of claim 1 wherein the device is a mouse.

4. The IDS system of claim 1 wherein the device is memory.

5. The IDS system of claim 1 wherein the bus is a wireless connection.

6. The IDS system of claim 1 wherein the device coupled to the docking station is integrated with the IDS.

7. The IDS of claim 1 further comprising a communication driver integrated with the IDS, the communication driver capable of converting signals between a bus-enabled data element and an IDS enabled data element.

8. The IDS of claim 1 further comprising a communication driver integrated with the handheld device, the communication driver capable of converting signals between a bus-enabled data element and a handheld data element.

9. The IDS of claim 1 wherein the IDS comprises an IDS Coprocessor having an IDS OS capable of directing a top-level device driver and a low-level device driver, wherein the low-level device driver is enabled to convert between a device data element and a IDS enabled data element.

10. A Intellegent Docking Station (IDS) system, comprising:
    a co-processor;
    an IDS operating system executed by the co-processor;
    a communication driver, the communication driver capable of sending and receiving bus-enabled data elements associated with a handheld computer operating system;
    a low-level device driver, the low-level device driver capable of sending and receiving device-based data elements;
    a top-level device driver, the top-level device driver capable of assembling and formatting data elements for a low-level device driver;
    the IDS operating system communicates with a first operating system for a handheld computer having a processor; and
    the IDS operating system being adapted to execute via a co-processor communicating with the top-level driver, and also enabled to deliver a device enabled data element to the low-level device driver, such that the IDS operating system accepts a first data that drives a first device, where the first device is not a docking station, and then the IDS operating system changes the first data to a second data that drives a second peripheral without the participation of the handheld computer operating system.

11. The system of claim 10 wherein the IDS computer operating system is enabled to convert a data element between a type compatible with the low-level device driver, and a type compatible with the top-level device driver.

12. A Intellegent Docking Station (IDS) system for enabling a handheld computer to use an intelligent docking station, the system comprising:
   a co-processor;
   an IDS operating system executed by the co-processor;
   a low-level device driver in communication with the IDS operating system;
   a top-level device driver in communication with the IDS operating system;
   a communication driver in communication with the top level device driver, the communication driver capable of converting signals between a bus-enabled data element associated with a handheld computer operating system and a handheld data element;
   the IDS operating system adapted to communicate with a first operating system for a handheld computer having a processor; and
   the IDS operating system being adapted to execute via a co-processor communicating with the top-level driver, and also enabled to deliver a device enabled data element to the low-level device driver, such that the IDS operating system accepts a first data that drives a first device, where the first device is not a docking station, and then the IDS operating system changes the first data to a second data that drives a second peripheral without the participation of the handheld computer operating system.

13. The software system of claim 12 further comprising a bus coupled between the communication driver and a second communication driver located in a handheld.

14. The software system of claim 13 wherein the bus is a wireless system.

15. The software system of claim 13 further comprising a top-level device driver coupled between the second communication driver and a handheld OS.

16. The software system of claim 12 wherein the low-level device driver is a keyboard driver.

17. The software system of claim 12 wherein the low-level device driver is a monitor driver.

18. The software system of claim 12 wherein the low-level device driver is capable of reading and writing data to memory.

19. The software system of claim 12 wherein the bus is a Bluetooth network.

20. The software system of claim 12 wherein the bus is an optical bus.

* * * * *